Figures 1, 2:
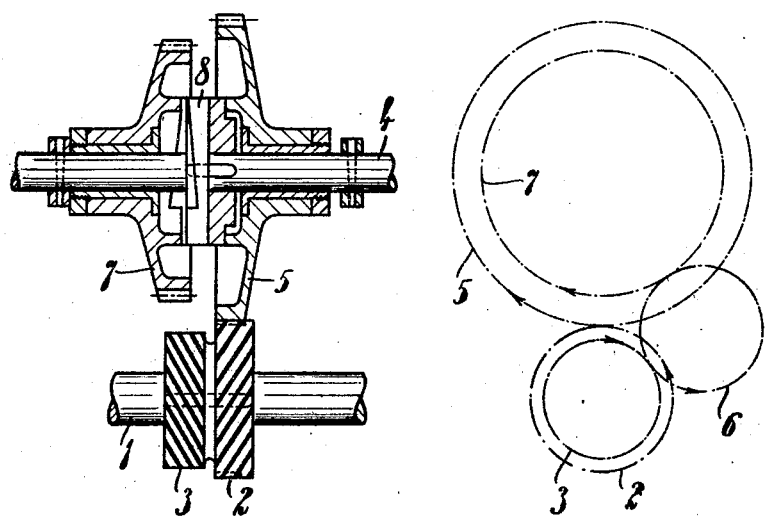

Aug. 4, 1925.

H. F. LEISSNER 1,548,782

INTERNAL COMBUSTION ENGINE

Filed Aug. 17, 1923

Patented Aug. 4, 1925.

1,548,782

UNITED STATES PATENT OFFICE.

HARRY FERDINAND LEISSNER, OF SODERTELJE, SWEDEN.

INTERNAL-COMBUSTION ENGINE.

Application filed August 17, 1923. Serial No. 657,978.

*To all whom it may concern:*

Be it known that I, HARRY FERDINAND LEISSNER, a citizen of the Kingdom of Sweden, residing at Sodertelje, Sweden, have invented new and useful Improvements in Internal-Combustion Engines, of which the following is a specification, application filed in Sweden August 14, 1922.

In internal combustion engines, the various periods, namely the exhausting of the burnt gases, the drawing in of fresh air, the compression, and the ignition together with combustion and expansion, follow, as known, in successive order during one or two revolutions of the engine, and such periods are controlled by the cam shaft. It has, therefore, been proposed to constantly rotate the came shaft with its means for controlling said periods in the same direction independently of the direction of rotation of the engine shaft, and in proper angular relation to the engine shaft, and means have also been proposed to automatically perform the changements required in reversing the direction of movement of the engine.

The present invention has for its object to provide simple and reliable means for effecting the above said changements. The invention is characterized by the fact that two toothed wheels slidably and rotatably mounted on the cam shaft and each engaging a toothed wheel on the engine shaft to be constantly rotated in opposite directions, are formed with spirally arranged teeth so that in the rotation of the engine shaft in one direction one toothed wheel on the cam shaft and in the rotation of the engine shaft in the opposite direction the other toothed wheel on the cam shaft is caused to move axially owing to the engagement of the spiral teeth, and engage clutch members fixed to the cam shaft.

In the accompanying drawing I have shown, by way of example, a device according to this invention. Fig. 1 is a side elevation of said device with part thereof in section, and Fig. 2 is a diagram illustrating the gearing interposed between the engine shaft and the cam shaft.

Rigidly secured to the engine shaft 1 are two toothed wheels 2 and 3. The toothed wheel 2 meshes directly in a toothed wheel 5 carried by the cam shaft 4, and the toothed wheel 3 is connected by means of an intermediate wheel 6 (as indicated in Fig. 2) to a toothed wheel 7 carried by the cam shaft. The gearing 2, 5 is shown as designed so as to have a ratio of gearing of 2:1 (four stroke), but may also be designed for a ratio of gearing equal to 1:1 (two stroke.) The same ratio of gearing may be chosen for the gearing 3, 6, 7 as for the gearing 2, 5. The toothed wheels 5 and 7 are rotatably mounted on the cam shaft 4. Carried by the cam shaft 4 in the space between the wheels 5 and 7 is a double acting clutch member 8 rigidly attached to the shaft 4 and capable of cooperating with either of the wheels 5 or 7. To enable the wheels 5, 7 to be operatively connected to or disconnected from the shaft 4 by means of the clutch member 8, said wheels 5, 7 are also slidably mounted on shaft 4, and formed with teeth to cooperate with those of the clutch member 8, the latter being designed so as to permit engagement in one relative position only or, in connection with four stroke engines, in two diametrically opposed relative positions of the clutch member 8 and either of the toothed wheels 5 or 7.

The toothed wheels 2, 3, 5, 6, 7 are formed with spiral teeth in a way such that in the rotation of the engine shaft 1 in one direction the toothed wheels 2, 3 will tend to displace the toothed wheels 5 and 7 in one direction, and in the rotation of shaft 1 in the opposite direction, a tendency will appear to displace the toothed wheels 5, 7 in the opposite direction.

According as the engine shaft 1 is started in the one direction or the other the wheel 5 and the wheel 7, respectively, will automatically be caused to mesh with the clutch member 8 and thereby coupled to the cam shaft 4. As, furthermore, the clutch may be closed in certain determined angular positions only between the wheels 5, 7 and the shaft 4, then the cam shaft 4 will constantly rotate in the same direction and in proper angular relation to the engine shaft to control the cycle of operation of the cylinder of the engine, independently of the direction of rotation of the engine shaft 1. It is evident, that in the reversal of the direction of movement of the engine shaft there will at once be effected an automatic release of the particular wheel 5 or 7 which is in engagement at that time, and an automatic connection of the other of said wheels to shaft 4 so that the shaft 4, notwithstanding the reversal of the direction of movement of the engine, will continue to rotate in the same direction as before.

It should be noted that the device shown is an illustrative example only and that many modifications may be made without departing from the principle of the invention. For instance, the double acting clutch member 8 may be made to slide on a feather or tooth, or there may be used two separate clutch members in substitution for the double member 8 shown.

What I claim is:—

In a power transmission device comprising a driving shaft, a driven shaft, a gear mechanism adapted to transmit a nonreversed rotation between said shafts, a second gear mechanism adapted to transmit a reversed rotation between said shafts, and means to bring one gear mechanism or the other into operation according to the direction of rotation of said driving shaft; said gear mechanisms comprising a spiral gear rigidly attached to said driving shaft, a spiral gear slidably and rotatably mounted on said driven shaft, and a one-half of a double acting clutch member rigidly attached to said driven shaft between said slidable gears, the direction of inclination of the teeth of said spiral gear being such that upon rotation of the driving shaft the rigid gears will effect a positive displacement of the slidable gears in one direction or the other in response to the direction of rotation of said driving shaft.

In testimony whereof I have signed my name.

HARRY FERDINAND LEISSNER.